United States Patent
Green

[15] 3,666,106
[45] May 30, 1972

[54] APPARATUS FOR MULTI-STAGE TREATMENT OF WASTE MATERIAL

[72] Inventor: Harry W. Green, Ann Arbor, Mich.
[73] Assignee: The Standard Products Company, Cleveland, Ohio
[22] Filed: May 5, 1971
[21] Appl. No.: 140,532

[52] U.S. Cl..................................210/201, 4/115, 210/16, 210/533
[51] Int. Cl...........................................C02c 1/02
[58] Field of Search................210/16, 170, 532 S, 533, 200, 210/259, 201, 252; 4/115

[56] References Cited

UNITED STATES PATENTS 3,202,285  8/1965  Williams..................................210/16
691,365  1/1902  Dittler..................................4/115 X

FOREIGN PATENTS OR APPLICATIONS 878,240  10/1942  France..................................210/170
861,936  3/1961  Great Britain..........................210/220

Primary Examiner—Michael Rogers
Attorney—Meyer, Tilberry & Body

[57] ABSTRACT

A waste disposal system includes three interconnected tanks. Waste material is subjected to anaerobic bacterial action in a first tank and then transferred to a second tank. The waste material is subjected to aerobic bacterial action in the second tank and is then transferred to the third tank. The waste material may be subjected to action of a treating agent in the third tank.

6 Claims, 1 Drawing Figure

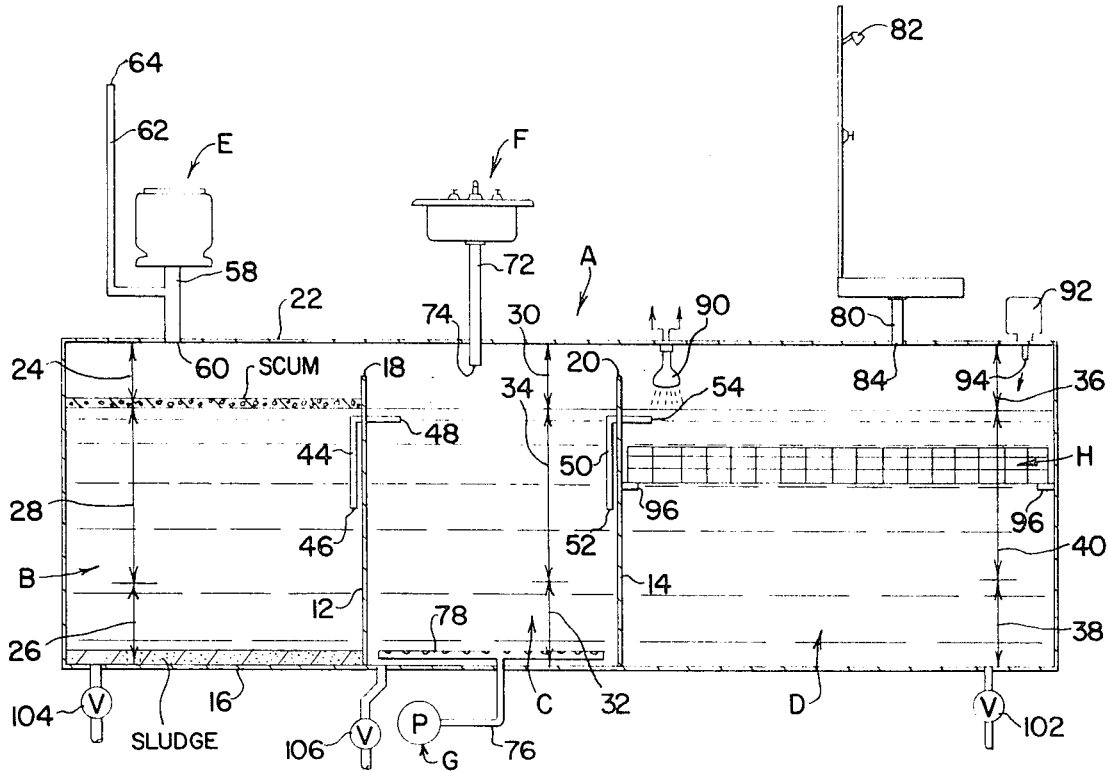

3,666,106

APPARATUS FOR MULTI-STAGE TREATMENT OF WASTE MATERIAL

BACKGROUND OF THE INVENTION

This application pertains to the art of waste disposal and more particularly to multi-stage treatment of waste material. The invention is particularly applicable to treatment of sewage and will be described with particular reference thereto although it will be appreciated that the invention has broader applications and may be used for treating any type of waste material which is converted to liquid by anaerobic and aerobic bacterial action.

Septic tanks for purifying and disposing of residential sewage are well-known. Such tanks are baffled so that effluent is drawn from below the surface level of the waste material to prevent solids from entering the disposal field. The outlet of the septic tank may be connected with field tile or with a gravel filled dry well. Anaerobic bacterial action in the tank converts organic solids to liquids and partially purifies the sewage. Residential septic tanks have a very large capacity and sewage remains therein for a substantial length of time so that anaerobic bacterial action substantially purifies the effluent from the tank and the effluent is not particularly noxious.

On human conveyances having sanitary facilities, a septic tank cannot be very large. Human conveyances having such facilities may include buses, motor homes, camping vehicles, boats, airplanes and trains. Due to the size limitation of septic tanks on human conveyances, it is necessary that the tanks be emptied at rather frequent intervals. Due to the necessity of emptying the tank at frequency intervals, anaerobic bacterial action will not have acted for a sufficient time to purify the sewage and it is very noxious. Emptying a septic tank of such noxious waste material is very offensive.

Other arrangements for disposing of sewage on human conveyances include an arrangement for feeding effluent from the waste tank to a heated vaporizer which vaporizes and burns the waste material. One system of this type is shown and described in U. S. Pat. Re. No. 26,891 issued May 26, 1970. In such a system, feeding noxious effluent to the vaporizer may cause the vapor to be noxious.

It would be desirable to have a septic system, particularly for human conveyances, which is faster acting than an ordinary septic tank to substantially purify sewage.

SUMMARY OF THE INVENTION

A septic tank unit, particularly for use on human conveyances, includes first, second and third interconnected tanks. Toilet waste is discharged into the first tank where it is subjected to anaerobic bacterial action. Effluent from the first tank is fed to the second tank in a partially purified state where it is then subjected to aerobic bacterial action. The waste material is then fed from the second tank to the third tank which serves as a holding tank for the waste material which has been substantially purified by the anaerobic and aerobic bacterial action in the first and second tanks.

In accordance with one arrangement, a treating agent may be positioned in the third tank for further purifying effluent discharged therein from the second tank. The treating agent may be an ultraviolet lamp positioned within the third tank for subjecting the waste material to ultraviolet rays as it flows from the second tank into the third tank. It is also possible to place sodium hypochlorite in the third tank for mixture with the material discharged therein. A filter filled with activated charcoal may also be positioned in the third tank for further removing odors from the waste material. Only the third tank may be emptied at periodic intervals and the waste material therein is substantially purified so that emptying of the third tank is not offensive to the senses of sight and smell. The first and second tanks may be emptied only at infrequent intervals to remove any undigested solids therefrom or when the conveyance is going into storage for a period of time. Liquid waste from other sanitary facilities, such as a sink, lavatory or shower, is not particularly noxious and may be discharged directly into either the second or third tanks.

It is a principal object of the present invention to provide an improved waste disposal system.

It is also an object of the present invention to provide a waste disposal system particularly adapted for use on human conveyances for rapidly purifying liquid and organic waste material.

It is another object of the present invention to provide an improved method for rapidly and economically purifying liquid and organic waste material.

BRIEF DESCRIPTION OF THE DRAWING

The invention may take physical form in certain parts and arrangements of parts, a preferred embodiment of which will be described in detail in this specification and illustrated in the accompanying drawings which form a part hereof.

The drawing is a side elevational view of the improved waste disposal system of the present invention and with a side wall omitted to show the interior.

DESCRIPTION OF THE PREFERRED EMBODIMENT

Referring now to the drawings, wherein the showings are for purposes of illustrating a preferred embodiment of the invention only and not for purposes of limiting same, FIG. 1 shows a waste disposal unit A for purifying liquid and organic waste material. Waste disposal unit A has three separate tanks including first tank B, second tank C and third tank D. Partitions 12 and 14 extend completely across waste disposal unit A and upwardly from bottom 16 thereof to define the three separate tanks. It will be recognized that three completely independent tanks may also be used. Top edges 18 and 20 of partitions 12 and 14 are spaced downwardly from top wall 22 of waste disposal unit A so that all three tanks are interconnected at the tops thereof by the space between top edges 18 and 20, and top wall 22.

First tank B has an upper portion 24 which may be considered as extending around one-fourth of the total height of unit A downward from top wall 22; a lower portion 26 which may be considered as extending one-fourth of the total height of unit A upward from bottom wall 16; and an intermediate portion 28 which may be considered as extending over one-half of the height of unit A between upper and lower portions 24 and 26. Second tank C has an upper portion 30 which may be considered as extending over one-fourth of the total height of unit A downward from top wall 22; a lower portion 32 which may be considered as extending one-fourth of the total height of unit A upward from bottom wall 16; and an intermediate portion 34 which may be considered as extending over one-half of the total height of unit A between upper and lower portions 30 and 32. Third tank D has an upper portion 36 which may be considered as extending over one-fourth of the total height of unit A downward from top wall 22; a lower portion 38 which may be considered as extending over one-fourth of the total height of unit A upwardly from bottom wall 16; and an intermediate portion 40 which may be considered as extending over one-half of the total height of unit A between upper and lower portions 36 and 38.

In accordance with one arrangement, conduit 44 extends through partition 12 to define a flow means connecting first and second tanks B and C for transferring waste material from tank B to tank C. Conduit 44 has an inlet opening 46 located at intermediate portion 28 of first tank B and an outlet opening 48 located at upper portion 30 of second tank C. Another conduit 50 extends through partition 14 and defines a flow means interconnecting second and third tanks C and D for transferring waste material from second tank C to third tank D. Conduit 50 has an inlet opening 52 located in intermediate portion 34 of second tank C and an outlet opening 54 located in upper portion 36 of third tank D.

A toilet E has a discharge conduit 58 communicating with first tank B through opening 60 in top wall 22. A vent conduit 62 is connected with conduit 58 and is opened to atmosphere at upper end 64 for venting the interior of waste disposal unit A to atmosphere. Conduit 62 is connected with toilet discharge conduit 58 below a trap in toilet E so that gases formed in waste disposal unit A are exhausted through vent conduit 62. Toilet E discharges liquid and organic waste material into first tank B. Waste material rises in first tank B until its top surface is at a level with outlet opening 48 of conduit 44. The waste material within first tank B undergoes anaerobic bacterial action. A scum forms on the surface of the waste material in first tank B to block the waste material against exposure to air so that anaerobic bacteria thrive within the waste material. The waste material has an upper layer of scum and floating solids located substantially in upper portion 24 of first tank B; a bottom layer of sludge and undigested solids located substantially in lower portion 26 of first tank B; and a middle layer of relatively clear liquid located in intermediate portion 28 of tank B. Anaerobic bacteria liquify and split the complex organic constituents of the sewage contained within first tank B. Under anaerobic conditions, a number of intermediate and end products are formed, such as ammonia, amino-acids, amides, peptones, hydrogen sulfide, indole, skatole and mercaptans. Such intermediate and end products are responsible for noxious odors. The odors and gases are discharged through vent conduit 62. When the waste material rises above the level of outlet opening 48 of conduit 44, waste material flows from intermediate portion 28 of first tank B through conduit 44 to upper portion 30 of second tank C.

In accordance with one arrangement, a lavatory F may be connected through conduit 72 for discharging directly into second tank C through opening 74. A kitchen sink or the like may also be connected directly with second tank C. An air pump G has its outlet connected by conduit 76 with a distributor 78 positioned in the bottom of second tank C. Distributor 78 may simply be a hollow rectangular member having a plurality of holes in the top thereof. Operation of air pump G results in the discharge of air through the holes in distributor 78 so that air bubbles upwardly through the waste material in second tank C to produce aerobic bacterial action within the waste material in second tank C. Under aerobic conditions, the main products of decomposition of carbonaceous organic material will be carbon dioxide and water. The air bubbling upward through the waste material in second tank C passes over the top edge of partition 12 and mixes with the noxious gases formed within first tank B so that the gases exhausted through vent conduit 62 are highly diluted with air and the noxious odor is greatly reduced.

When the level of waste material within second tank C reaches the level of outlet opening 54 of conduit 50, waste material flows from intermediate portion 34 of second tank C through inlet opening 52 of conduit 50 and into upper portion 36 of third tank D through outlet opening 54. In one arrangement, discharge conduit 80 from shower 82 may discharge directly into third tank D through opening 84 in a side wall of waste disposal unit A. It will be recognized that shower 82 may be connected with second tank C if so desired. Waste water from a shower is relatively clean and does not produce substantial noxious odors so that thorough treatment of it is not necessary. However, it should be recognized that various sanitary facilities may be connected in different combinations with any or all of the three separate tanks. It will also be recognized that the tanks may be interconnected by baffles rather than conduits 44 and 50 as described.

In accordance with a preferred arrangement, treating agent means is provided in third tank D for treating waste material therein. In one arrangement, an ultraviolet lamp 90 may be positioned so that its rays are directed against waste material flowing through outlet opening 54 of conduit 50 from second tank C. In another arrangement, a metering dispenser 92 may have its outlet positioned within tank D for dripping a treating agent such as sodium hypochlorite into third tank D. In another arrangement, the top wall of third tank D may be removable and a basket H may be supported in upper portion 36 thereof on supports 96. Basket H may contain activated charcoal so that waste material entering third tank D has odors removed therefrom by being filtered through activated charcoal. Basket H may also contain granular sodium hypochlorite or other chemical treating agent.

After the anaerobic and aerobic treatment in first and second tanks B and C, and after addition of the treating agent in third tank D, the waste material in third tank D will be substantially pure and free of any noxious odors. Third tank D has a valve discharge opening 102 for emptying waste material from third tank D. Discharge of waste material from third tank D through outlet opening 102 is not offensive to senses of sight or smell. The aerobic treatment within second tank C provides more rapid purification of the waster material than in an ordinary residential septic tank. First and second tanks B and C also have valve discharge outlets 104 and 106 for periodic removal of sludge and cleaning of the first and second tanks. It will be recognized that openings may be provided in top wall 22 for each of the three tanks so that an intake line connected to a suction pump may be dropped down into any one of the three tanks for removing waste material therefrom.

In a preferred arrangement, first tank B has a larger capacity than second tank C, and third tank D has a larger capacity than first tank B. In one arrangement, first tank B may have a 16 gallon capacity; second tank C have a 12 gallon capacity; and third tank E have a 32 gallon capacity. This arrangement provides sufficient capacity within first tank B so that anaerobic bacterial action may occur for a sufficient time to purify waste material before it discharges into second tank C. Second tank C requires a much smaller capacity because the aerobic action occurring therein rapidly acts upon the waste material and the waste material discharged into second tank C requires less treatment because it is already partially purified. Third tank D is large enough to hold sufficient waste material so that periodic emptying thereof will satisfy the use requirements of the conveyance on which waste disposal unit A is installed.

While the invention has been described with reference to a preferred embodiment, it is obvious that equivalent alterations and modifications will occur to others skilled in the art upon the reading and understanding of this specification. The present invention includes all such equivalent alterations and modifications and is limited only by the scope of the claims.

Having thus described my invention, I claim:

1. A waste disposal unit including a receptacle having spaced-apart partition means therein for forming first, second and third waste tanks in said receptacle, a toilet outlet connected with said first waste tank for discharging liquid and organic waste material therein, said first tank having upper and lower portions and an intermediate portion, said second waste tank having upper and lower portions and an intermediate portion, flow means connecting said intermediate portion of said first tank with said upper portion of said second tank for supplying waste material from said first tank to said second tank, aerating means for supplying air to said lower portion of said second tank for bubbling air upwardly through liquid waste material in said second tank, said third tank having upper and lower portions and an intermediate portion, and flow means connecting said intermediate portion of said second tank with said upper portion of said third tank for supplying waste material from said second tank to said third tank, said first tank having a substantially greater capacity than said second tank and said third tank having a substantially greater capacity than said first tank.

2. The system of claim 1 and further including chemical treating agent supply means for supplying chemical treating agent material to said third tank.

3. The system of claim 1 and further including vent means for venting all of said tanks to atmosphere.

4. The system of claim 3 wherein said first and second tanks are interconnected by a vent opening and said vent means is common to both of said first and second tanks whereby air supplied to said second tank by said aerating means mixes with gases from said first tank for simultaneous discharge through said vent means.

5. The system of claim 1 and further including a lavatory outlet connected with said second tank for discharging liquid waste therein.

6. The system of claim 1 and further including a separate discharge opening for each of said tanks.

* * * * *